US006909371B2

(12) United States Patent
Zukowski et al.

(10) Patent No.: US 6,909,371 B2
(45) Date of Patent: Jun. 21, 2005

(54) METHOD FOR DYNAMICALLY OBTAINING TELEPHONE NUMBERS

(75) Inventors: Deborra J. Zukowski, Newtown, CT (US); Brian M. Romansky, Monroe, CT (US); Ronald Reichman, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 180 days.

(21) Appl. No.: 10/322,150

(22) Filed: Dec. 17, 2002

(65) Prior Publication Data

US 2004/0113788 A1 Jun. 17, 2004

(51) Int. Cl.[7] .............................................. G08B 13/14
(52) U.S. Cl. .................... 340/572.1; 235/375; 235/385; 342/465; 343/895; 705/28
(58) Field of Search .................. 340/572.1; 379/201.07, 379/201.08, 211.02, 212.01, 218.01

(56) References Cited

U.S. PATENT DOCUMENTS

| | | | |
|---|---|---|---|
| 4,598,275 A | | 7/1986 | Ross et al. |
| 4,688,026 A | * | 8/1987 | Scribner et al. ............ 235/385 |
| 4,752,951 A | | 6/1988 | Konneker |
| 5,051,741 A | * | 9/1991 | Wesby ................... 340/825.49 |
| 5,347,733 A | | 9/1994 | Whittington |
| 5,363,425 A | | 11/1994 | Mufti et al. |
| 5,402,469 A | | 3/1995 | Hopper et al. |
| 5,574,470 A | * | 11/1996 | de Vall ....................... 343/895 |
| 5,610,589 A | | 3/1997 | Evans et al. |
| 5,774,876 A | * | 6/1998 | Woolley et al. ................ 705/28 |
| 5,886,634 A | * | 3/1999 | Muhme .................... 340/572.1 |
| 5,977,913 A | * | 11/1999 | Christ ......................... 342/465 |
| 6,156,988 A | | 12/2000 | Baker |
| 6,232,877 B1 | * | 5/2001 | Ashwin .................... 340/572.1 |
| 6,329,908 B1 | | 12/2001 | Frecska |
| 6,396,413 B2 | * | 5/2002 | Hines et al. ............ 340/825.49 |
| 6,657,543 B1 | * | 12/2003 | Chung ...................... 340/573.1 |
| 2003/0057270 A1 | * | 3/2003 | Collen ......................... 235/375 |

* cited by examiner

*Primary Examiner*—Thomas J. Mullen, Jr.
*Assistant Examiner*—Samuel J Walk
(74) *Attorney, Agent, or Firm*—Ronald Reichman; Angelo N. Chaclas

(57) ABSTRACT

A method for automatically changing the address and telephone number of an occupant when the occupant moves from one internal address to another internal address. The foregoing is accomplished by placing a radio frequency identification tag in occupant's nameplate, wherein the tag contains encoding information that identifies the occupant so that when the occupant changes his/her location, the nameplate may be used to update a data base and determine the occupant's new address and telephone number.

18 Claims, 6 Drawing Sheets

| READER | INTERNAL ADDRESS | TELEPHONE NUMBER |
|---|---|---|
| 26A | 5-100 | 442-1000 |
| 26B | 5-101 | 442-1001 |
| 26C | 5-102 | 442-1002 |
| 26D | 5-103 | 442-1003 |
| 26E | 5-104 | 442-1004 |
| 29C | 5-123 | 476-2000 |
| 29D | 5-124 | 476-2001 |

| OCCUPANT'S NAME | INTERNAL ADDRESS | TELEPHONE NUMBER |
|---|---|---|
| A | 5-100 | 442-1000 |
| B | 5-118 | 442-1250 |
| C | 5-120 | 442-1252 |
| D | 5-117 | 442-1200 |
| Z | 5-113 | 442-3001 |

METHOD FOR DYNAMICALLY OBTAINING TELEPHONE NUMBERS

CROSS REFERENCE TO RELATED APPLICATIONS

Reference is made to commonly assigned co-pending patent application Ser. No. 10/322,251 filed herewith entitled "Method For Dynamically Addressing Physical Mail" in the names of Deborrah J. Zukowski, Brian M. Romansky, Easton F. Bell, and Megha Sharma.

FIELD OF THE INVENTION

The invention relates generally to the field of internal tracking systems and, more particularly, to systems for determining internal telephone numbers.

BACKGROUND OF THE INVENTION

The telecommunications network in the United States forms the basis for many communications services offered by various telephone companies. This network involves over 100 million telephones that link together over 200 million people and 4 million places of business in the United States. Telephone companies publish directories for various towns and cities that indicate the telephone numbers of people and businesses residing in the specified towns and cities. Large establishments have many people who have telephones in their offices and who receive many telephone calls. Consequently, large establishments publish telephone directories that indicate the telephone numbers of the people and departments in the large establishment.

Large establishments often assign individual internal addresses, which are often kept in computer databases, to locate the occupants of their buildings. The internal addresses also enable the establishment to know where the establishment's telephones are located and to make it easier for mailroom personnel to deliver internal mail.

People and departments in large establishments frequently have their offices moved to new locations. As an occupant moves from one office or desk to another, the occupant's internal address changes and telephone number changes. The telephone system or some internal department should indicate the occupant's new telephone number so that the occupant will continue to receive telephone calls. In order for the occupant to continue to receive telephone calls, someone would need to change the occupant's telephone number in a database and/or publish new telephone directories. Often, the occupant's telephone number change does not occur, so telephone calls continue to be directed to the occupant's old telephone number, inconveniencing the person who has the occupant's old telephone number. Thus, a disadvantage of the prior art is that a great amount of time may expire before members of the large establishment and outside individuals realize that the occupant changed his/her telephone number.

SUMMARY OF THE INVENTION

This invention overcomes the disadvantages of the prior art by automatically changing the telephone of an occupant in a database when the occupant moves from one internal address to another internal address.

The foregoing is accomplished by placing a radio frequency identification tag in the occupant's nameplate, wherein the tag contains encoding information that identifies the occupant so that when the occupant changes his/her location, the nameplate may be used to update a data base and determine the occupant's new telephone number.

DETAILED DESCRIPTION OF THE PREFERRED EMBODIMENT

Figure 1:
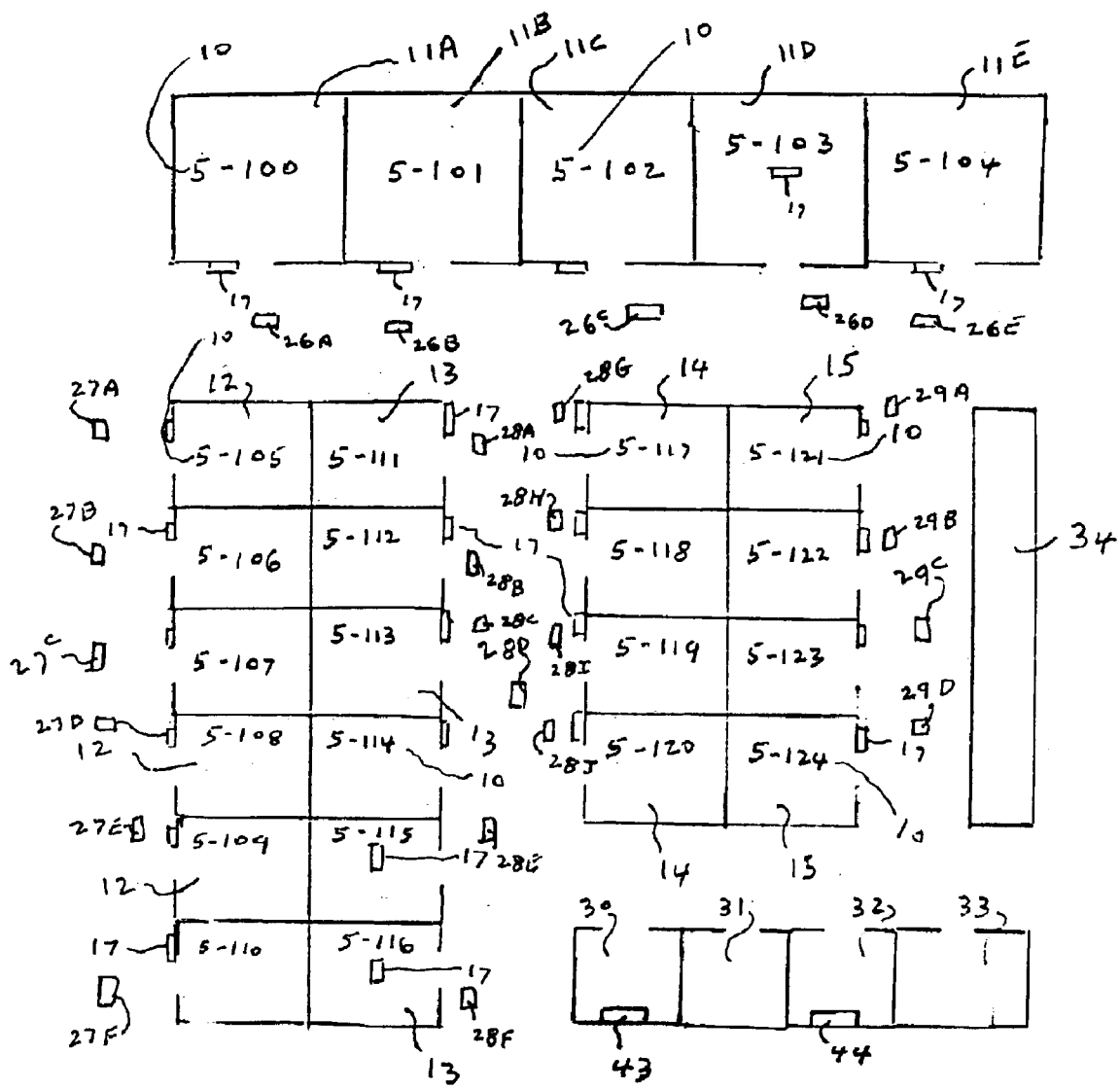
FIG. 1 is a drawing showing some of the offices on floor 5 of a large office building.
Figure 2:
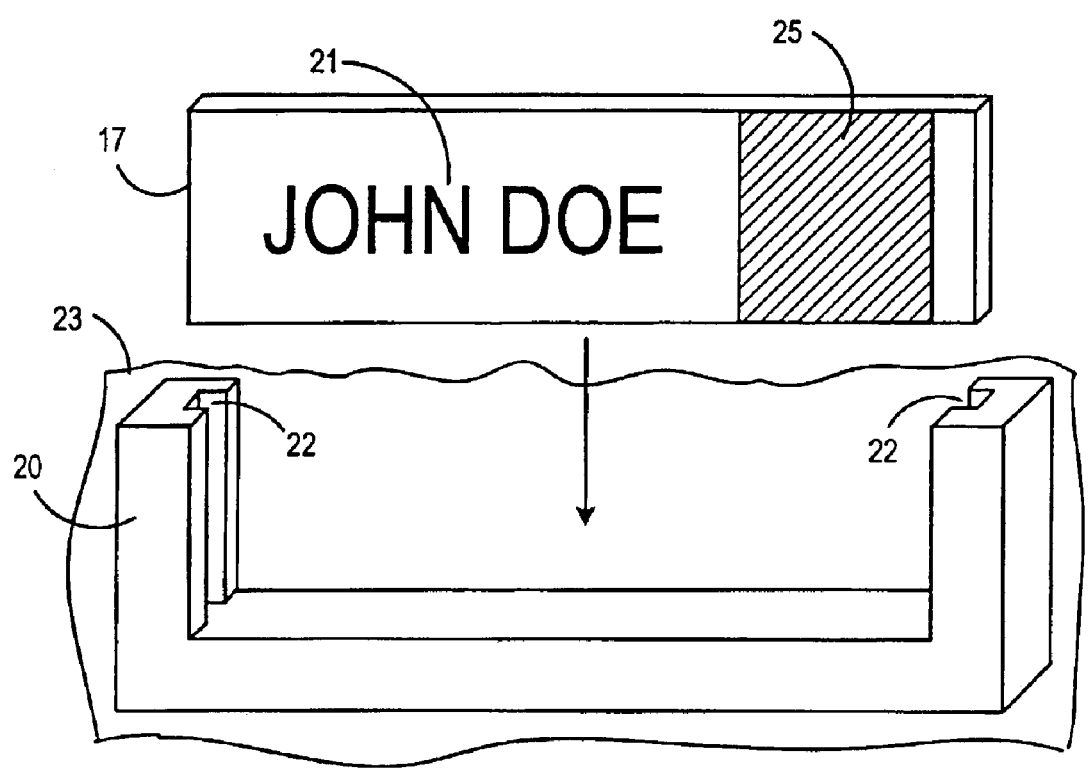
FIG. 2 is a perspective drawing of nameplate 17 showing how nameplate 17 may be placed in a holder.

Referring now to the drawings in detail and more particularly to FIG. 1, the reference characters 11A–11E represent a plurality of large offices on a portion of floor 5 of a large office building. Small offices 12, 13, 14 and 15, mail stops 30 and 32, coffee room 31, photocopy room 33 and filing cabinets 34 and are also on floor 5. Telephones (not shown) are located in each large office 11A–11E and each small office 12, 13, 14 and 15. Each large office 11A–11E and each small office 12, 13, 14 and 15 is assigned an internal address 10. A removable name plate 17 containing a radio frequency identification (RFID) tag 25 (FIG. 2), that indicates the user of name plate 17, is attached to a wall near the entrance of each office 11A–11E and 12–15 by means of a holder 20 (FIG. 2). Holder 20 may also be placed on any flat surface, i.e., desk inside offices 11–15.

The space containing the offices 11A–11E and 12–15 is scanned with scanning devices, e.g., radio frequency identification tag readers 26A–26E, 27A–27F, 28A–28J, and 29A–29D which periodically scan the area to determine if any RFID tag 25 (FIG. 2) is within a given distance from any reader 26A–26E, 27A–27F, 28A–28J, and 29A–29D. Reader 26A scans office 11A, and reader 26B scans office 11B. Reader 26C scans office 11C, and reader 26D scans office 11D. Reader 26E scans office 11E. Readers 27A through 27F, respectively, scan offices 5-105 to 5-110, and readers 28A through 28J, respectively, scan offices 5-111 through 5-120. Readers 29A through 29D, respectively, scan offices 5-121 through 5-124. Radio frequency identification tag readers 26A–26E, 27A–27F, 28A–28J and 29A–29D may be the Pin Point Cell Controller Network manufactured by RFT Technologies of 3125 N. 126$^{th}$ Street Brookfield, Wis. 53005.

Display 43, located in mail stop 30 will indicate all of the telephone numbers of all of the users of name plates 17, and display 44 located in mail stop 32 will indicate all of the telephone numbers of all of the users of name plates 17.

FIG. 2 is a perspective drawing of nameplate 17 showing how nameplate 17 may be placed in a holder 20. Nameplate 17 has a region 21 that indicates the user of nameplate 17 and a RFID tag 25 that indicates the user of nameplate 17. RFID tag 25 may be the Pin Point Active RF Tag manufactured by RFT Technologies of 3125 N. 126$^{th}$ Street Brookfield, Wis. 53005.

Additional information regarding the user of name plate 17 may be entered into RFID tag 25, i.e., the user's employee number, the user's social security number, etc. Thus, the information in RFID tag 25 will uniquely identify the user of nameplate 17. Nameplate 17 may be placed in slot 22 of holder 20 and removed from slot 22 of holder 20. Holder 20 is attached to the wall of the entrances of the offices described in FIG. 1 or placed on any flat surface, i.e., desk inside the offices described in FIG. 1. Holder 20 is attached to wall 23 by any known means, i.e., screws, nails, glue, etc.

It would be obvious to one skilled in the art that tag readers 26A–26E, 27A–27F, 28A–28J, and 29A–29D (FIG. 1) may be incorporated into holders 20.

Figures 3A, 3B, 3C:
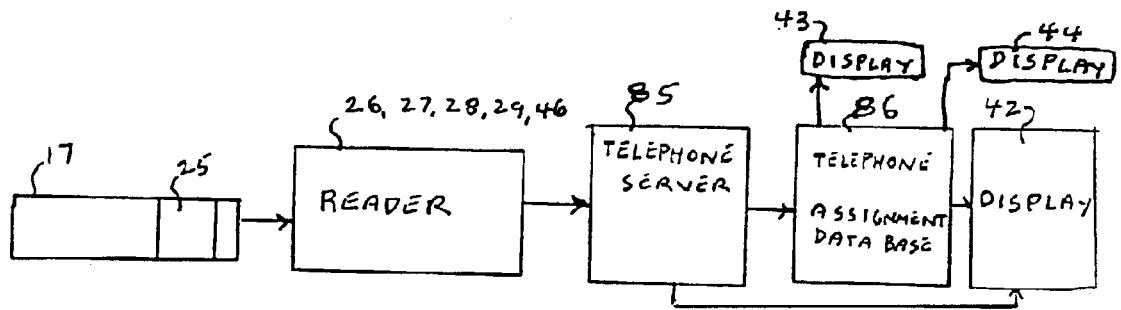
FIG. 3A is a drawing showing the transmission of information from RFID tag 25 to telephone assignment data base 86.
FIG. 3B is a drawing showing the reader table 87 of telephone server 85 of FIG. 3A.
FIG. 3C is a drawing of telephone assignment database 86.

FIG. 3A is a drawing showing the transmission of information from RFID tag 25 to telephone assignment data base 86. Periodically, radio frequency identification tag readers 26A–26E, 27A–27F, 28A–28J, and 29A–29D, poll their areas of search to determine all nameplates 17 in their areas of search. The list of name plates, along with each tag reader's 26A–26E, 27A–27F, 28A–28J, and 29A–29D identity and the users of name plates 17 indicated in tags 25 are transmitted to telephone server 85. Telephone server 85 includes a nameplate tracking system reader table 87 (FIG. 3B) that associates each reader to a group of internal addresses 9. Readers 26A through 26E, respectively, will read internal addresses 5-100 to 5-104 (FIG. 1), and readers 27A through 27F, respectively, will read internal addresses 5-105 to 5-110. Readers 28A through 28J, respectively, will read internal addresses 5-111 to 5-120 (FIG. 1), and readers 29A through 29D, respectively, will read internal addresses 5-121 to 5-124. Server 85 is coupled to telephone assignment database 86. Database 86 will be described in the description of FIG. 3C. Telephone server 85 and database 86 are coupled to display 42. Display 42 displays information contained in telephone server 85 and database 86. Display 43, located in mail stop 30, is coupled to database 86; and, display 44, located in mail stop 32, is coupled to database 86. Display 43 and display 44 will indicate all of the telephone numbers of all of the users of nameplates 17.

It will be obvious to one skilled in the art that radio frequency identification tag readers and radio frequency identification tags may be located on all or some of the floors of a building and/or located in different buildings and then coupled to telephone server 85.

FIG. 3B is a drawing showing the reader table 87 of telephone server 85 of FIG. 3A. Reader table 87 is a static pre-configured table. Column 88, of table 87 indicates the RFID tag reader identity that reads tags 25, and column 89 indicates the internal address 10 that is associated with the particular RFID tag reader. Column 90 indicates the telephone number that is associated with the internal address or actual room number.

FIG. 3C is a drawing of telephone assignment database 86. Database 86 is a dynamic database that associates the user of nameplate 17 identified in the RFID tag 25 with the occupant's internal address 10 and telephone number. Column 91 of database 86 indicates the occupant's name, and column 92 indicates his/her internal address. Column 93 of database 86 indicates the occupant's telephone number. When a person changes offices, that person usually will be assigned a different telephone number.

Figure 4:
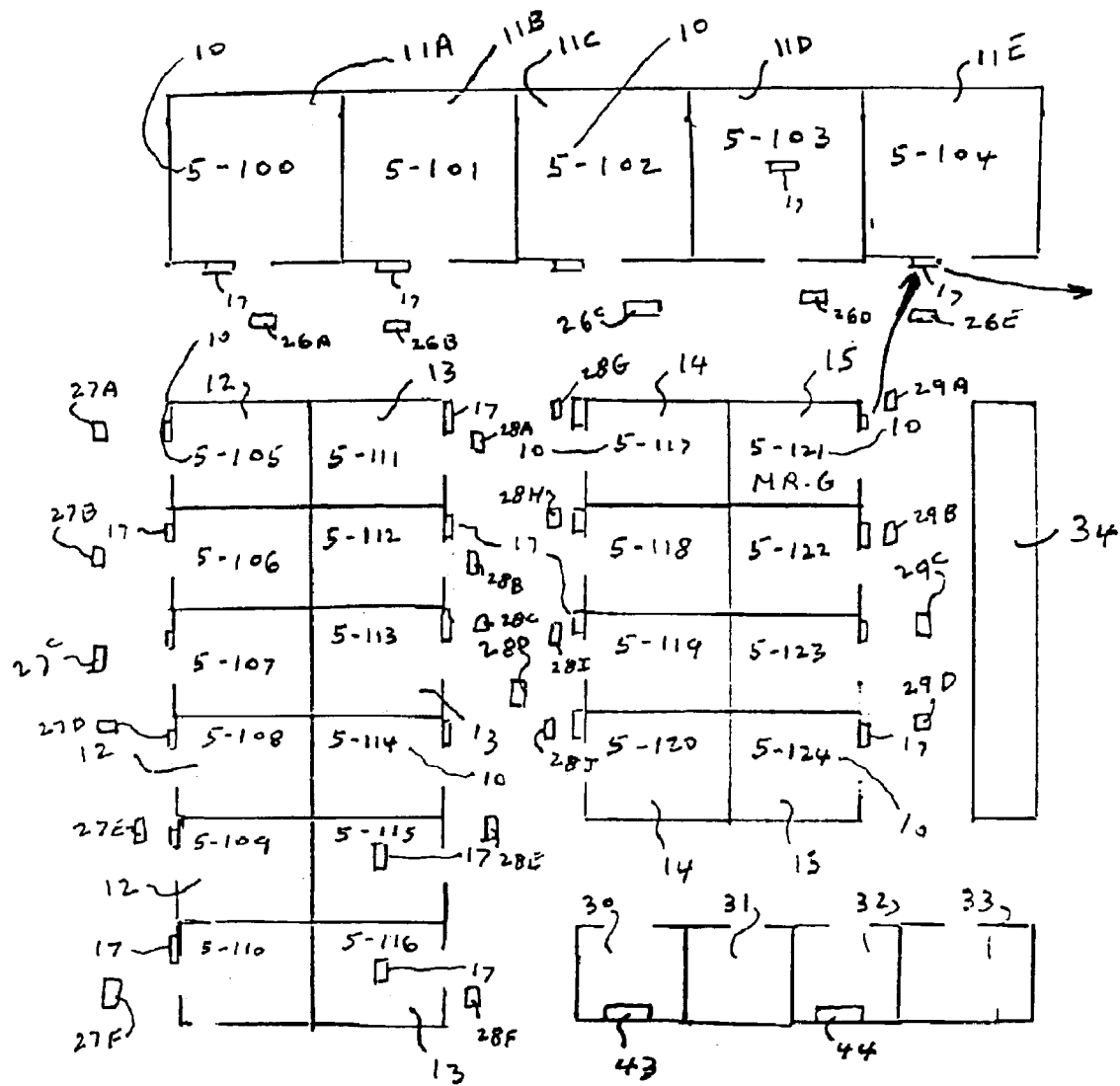
FIG. 4 is a drawing showing an occupant of an office 15 of FIG. 1 moving to office 11E of FIG. 1.

FIG. 4 is a drawing showing an occupant of an office 15 of FIG. 1 having internal address 5-121 moving to office 11E of FIG. 1 having internal address 5-104. When Mr. G, the occupant of one of the offices 15, moves to office 11E, Mr. G removes his name plate 17 from a holder 20 (FIG. 2) attached to the wall near the entrance to his old office 15 and places name plate 17 in a holder 20 (FIG. 2) attached to the wall near the entrance to his new office 11E. The prior occupant of office 11E, Ms. H removed her name plate 17 and placed it in a holder 20 (FIG. 2) attached to the wall near the entrance to her new office (not shown) which is on the twentieth floor of the same office building. Mr. G may notify the establishment's telephone personnel to update assignment database 86 to indicate that he has moved to office 11E and to indicate his new telephone number.

Whether or not Mr. G notifies the establishment's telephone personnel to update assignment database 86 to indicate that he has moved to office 11E, reader 26E will poll its area of search during its next search period and determine that a new nameplate 17 is at office 11E. If Ms. H does not notify establishment's telephone personnel to update assignment database 86 to indicate that she has moved to a new office, a reader (not shown) on the twentieth floor similar to reader 26 will poll its area of search during its next search period and determine that a new name plate 17 is at Ms. H's new office.

Figure 5A:
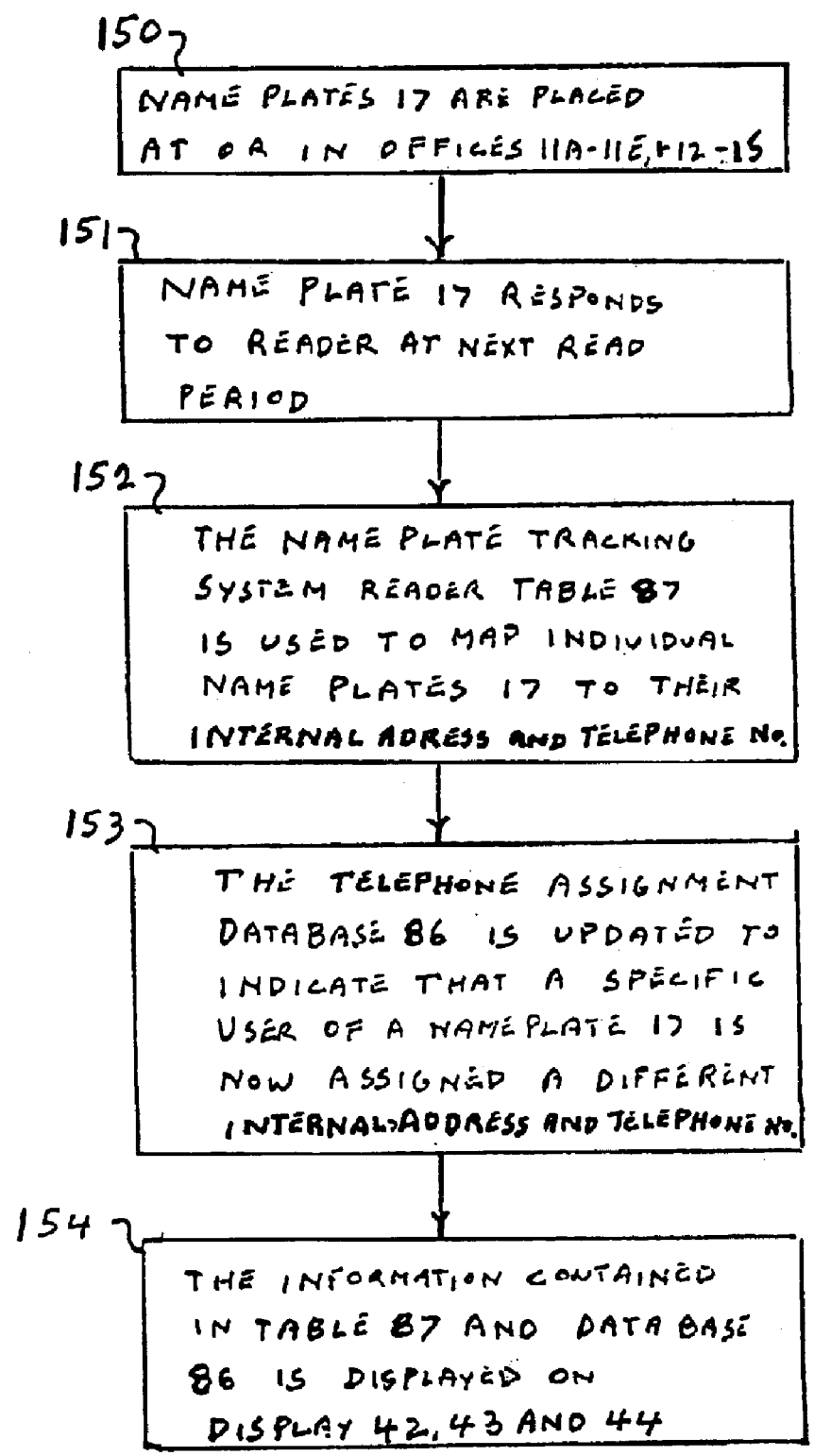
FIG. 5A is a drawing of the process flow for the transmission of information from RFID tag 25 to telephone assignment database 86, when a occupant changes offices and will have a different telephone number.

FIG. 5A is a drawing of the process flow for the transmission of information from RFID tag 25 to telephone assignment database 86, when an occupant changes offices and will have a different telephone number. The process begins in step 150, where nameplates 17 are placed at the entrances to or in offices 11A–11E, and 12–15. Next, in step 151, individual nameplates 17 respond to their assigned readers at the next reader period. Then, in step 152, the nameplate tracking reader table 87 is used to map individual nameplates 17 to their internal addresses and assigned telephone numbers. Now in step 153, the telephone assignment database 86 is updated to indicate that a specific user of a nameplate 17 is now assigned a different internal address and a telephone number associated with their new internal address. Then in step 154, the information contained in nameplate tracking reader table 87 and database 86 is displayed in displays 42, 43 and 44. An e-mail is sent to the person who moved his/her office requesting if he/she would like to order new business cards. If a new business card is requested, a business card provider may be notified to print new business cards indicating the new internal address and telephone number for the user of nameplate 17.

Figure 5B:
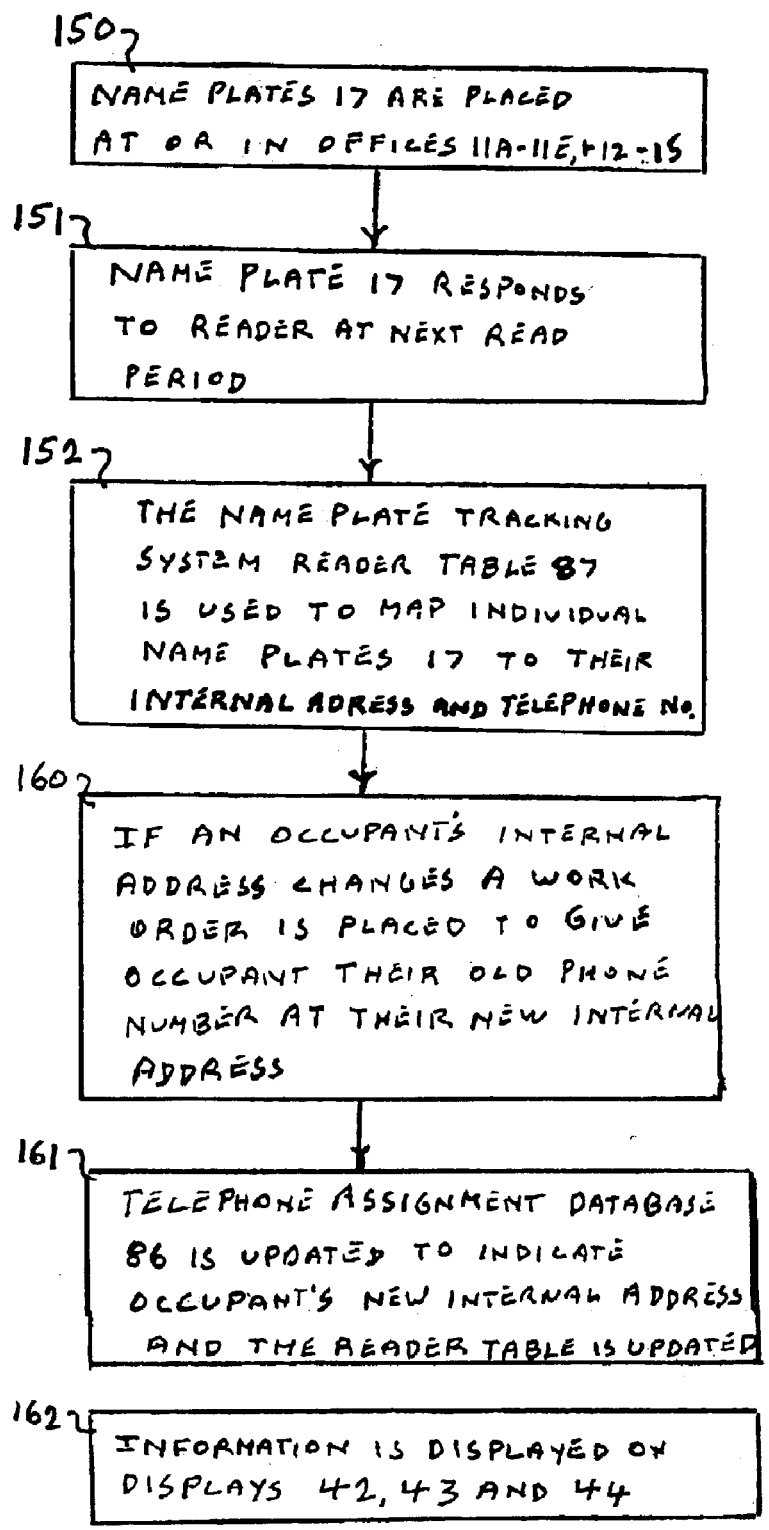
FIG. 5B is a drawing of the process flow for the transmission of information from RFID tag 25 to telephone assignment database 86, when a occupant changes offices and will have the same telephone number that they had in their old office.

FIG. 5B is a drawing of the process flow for the transmission of information from RFID tag 25 to telephone assignment database 86, when an occupant changes offices and will have the same telephone number that he/she had in his/her office. Steps 150–152 are the same as steps 150–152 of FIG. 4A. In step 160 if an occupant's internal address changes, a work order is placed for the establishment's telephone personnel to give the occupant the old telephone number at the new internal address. Then in step 161, the telephone assignment database 86 is updated to indicate occupant's new internal address. The reader table is also updated, and the phone numbers are switched from the old office to the new office. Now in step 162, the information contained in nameplate tracking reader table 87 and database 86 is displayed in displays 42, 43 and 44. An e-mail is sent to the person who moved his/her office requesting if he/she would like to order new business cards. A business card provider may be notified to print new business cards indicating the new internal address for the user of nameplate 17.

The above specification describes a new and improved method for changing the address and telephone number of an occupant when the occupant moves from one internal address to another internal address. It is realized that the above description may indicate to those skilled in the art additional ways in which the principles of this invention may be used without departing from the spirit. Therefore, it is intended that this invention be limited only by the scope of the appended claims.

What is claimed is:

1. A method for relating the telephone numbers of occupants of establishments to the internal address of the occupant, said method comprises the steps of:

A. storing an occupant's name in an establishment in an electronic mechanism contained in a nameplate;

B. relating telephone numbers in an establishment with an occupant's internal address that appears in the name plate; and C. reading the electronic mechanism to determine the internal address of the nameplate and the telephone number of the occupant.

2. The method claimed in claim 1, wherein the nameplate is near the entrance to the occupant's office.

3. The method claimed in claim 2, further including the step of:

moving the nameplate near the entrance to the occupant's new office when the location of the occupant's office is changed.

4. The method claimed in claim 3, wherein occupant's office is located on a different floor.

5. The method claimed in claim 3, wherein occupant's office is located in a different building.

6. The method claimed in claim 3, further including the step of:

notifying a printer to print business cards indicating occupant's new office location.

7. The method claimed in claim 3, further including the step of:

notifying a user of the nameplate if he/she wants new business cards after an office change.

8. The method claimed in claim 1, further including the step of uniquely storing occupant's name in the electronic mechanism.

9. The method claimed in claim 8, wherein the occupant's name is uniquely identified, by placing occupant's social security number in the electronic mechanism.

10. The method claimed in claim 8, wherein the occupant's name is uniquely identified, by placing occupant's employee number in the electronic mechanism.

11. The method claimed in claim 1, wherein the nameplate includes occupant's name.

12. The method claimed in claim 1, wherein the electronic mechanism is a radio frequency identification tag.

13. The method claimed in claim 12, wherein a radio frequency identification tag reader is used to read the radio frequency identification tag.

14. The method claimed in claim 1, further including the steps of:

storing occupants name and location in a database.

15. The method claimed in claim 14, further including the steps of:

displaying occupant's name and location.

16. The method claimed in claim 14, further including the step of:

automatically changing the telephone number of an occupant in a database when the occupant moves from one internal address to another internal address.

17. The method claimed in claim 16, further including the step of:

changing occupant's telephone number to the telephone number assigned to the new internal address.

18. The method claimed in claim 14, further including the step of:

causing occupant's telephone number at occupant's old internal address to be occupant's telephone number at occupant's new internal address.

* * * * *